United States Patent
Ahuja et al.

[11] Patent Number: 5,932,991
[45] Date of Patent: Aug. 3, 1999

[54] SYSTEM AND METHOD FOR BATTERY CHARGING WITH ACOUSTIC EXCITATION

[75] Inventors: Krisham K. Ahuja, Atlanta; Yi Ding, Smyrna, both of Ga.

[73] Assignee: Georgia Tech Research Corporation, Atlanta, Ga.

[21] Appl. No.: 09/014,388

[22] Filed: Jan. 28, 1998

Related U.S. Application Data

[60] Provisional application No. 60/037,258, Jan. 31, 1997.

[51] Int. Cl.$^6$ ...................................................... H02J 7/00
[52] U.S. Cl. .............................................. 320/137; 429/4
[58] Field of Search .................................... 320/137, 147; 429/4

[56] References Cited

U.S. PATENT DOCUMENTS

| | | | |
|---|---|---|---|
| 4,388,583 | 6/1983 | Kruger | 320/46 |
| 5,378,551 | 1/1995 | Meadows et al. | 429/66 |
| 5,436,548 | 7/1995 | Thomas | 320/2 |
| 5,629,599 | 5/1997 | Malaspina et al. | 320/2 |
| 5,670,963 | 9/1997 | Broell et al. | 320/22 |

FOREIGN PATENT DOCUMENTS

| | | | |
|---|---|---|---|
| 57-180878 | 11/1982 | Japan | H01H 10/42 |
| 4-274175 | 9/1992 | Japan | H01H 10/44 |

*Primary Examiner*—Peter S. Wong
*Assistant Examiner*—K. Shin
*Attorney, Agent, or Firm*—Thomas, Kayden, Horstemeyer & Risley, L.L.P.

[57] ABSTRACT

The present invention is a system and method for enhancing the charging of a battery by exposing the battery to acoustic excitation while the battery is being charged. By adding acoustic excitation to the charging process, the present invention reduces the time needed to charge the battery, reduces the energy needed for charging, and increases the battery's cycle life. The present invention may be used to charge new and used batteries and to rejuvenate dead batteries.

22 Claims, 9 Drawing Sheets

SYSTEM AND METHOD FOR BATTERY CHARGING WITH ACOUSTIC EXCITATION

CROSS REFERENCE TO RELATED APPLICATIONS

The present application claims priority to and the benefit of the filing date of Provisional Patent Application Ser. No. 60/037,258 filed Jan. 31, 1997, entitled "Enhanced Battery Charging By Sound," which, in its entirety, is hereby incorporated by reference in this application.

FIELD OF THE INVENTION

The present invention generally relates to the field of battery charging, and in particular to the enhancement of the charging of batteries to reduce the time needed to charge the battery, reduce the energy needed for charging, and increase the battery's cycle life.

BACKGROUND OF THE INVENTION

Rechargeable lead-acid batteries, nickel cadmium (NiCd) batteries and other similar batteries are widely used in a variety of applications, from children's toys to video cameras. Rechargeable batteries are also necessary for powering electric vehicles. Because of clean air concerns, electric vehicles may be the most important future application for rechargeable batteries. Unfortunately, present day batteries used in prototype electric vehicles are limited in their ability to maintain an adequate charge over a period of extended use and subsequently require long charging times. Thus, there is a clear need to develop new and more efficient ways to recharge batteries and, more particularly, to reduce charging times.

Two basic processes are now used to charge and recharge batteries. The first process involves supplying a constant voltage to the chargeable battery. The second process involves supplying a constant current to the chargeable battery. When lead-acid batteries used in electric vehicles are recharged using these conventional processes, the recharging times are of the order of ten hours.

Considerable research effort is being directed to the development of procedures and equipment to reduce battery recharging times. Various rapid charging processes have been developed. One process is based on the concept of internal resistance-free voltage and use of interrupting circuitry for programmed interruption of electrical charging power to batteries undergoing charge. Preselected time intervals are employed to permit the detection of the internal resistance-free voltage. The power delivered to the battery is reduced when the resistance-free voltage exceeds the preselected reference voltage. The rate of charge is reduced gradually to maintain internal resistance-free voltage in the battery at preselected reference voltages throughout the charging process.

Another process involves a pulse charging methodology for rapid charging of batteries used in electric vehicles. This process involves one or more depolarization pulses that are believed to alter ion migration between electrodes in ways that allow charged ions to more efficiently interact with the electrode plate. As a result, heat production during charging is minimized. This technique stirs the ions in the battery's electrolyte by applying alternating positive and negative pulses which helps to reduce the electrode polarization and increase charging efficiency.

Present rapid charging techniques suffer from a number of significant problems. While known rapid-charge algorithms take advantage of the high-charge acceptance during initial charging, recharging a battery that has been almost fully discharged requires as much time to charge the battery from 85% to 100% state of charge (SOC) as was required using conventional (i.e., non-rapid charging) techniques. This is because rapid charging produces an undesirable amount of heat and gas, which can result in battery failure, unless the "rapid charge rate" is reduced during the last 15% of the charging process. The net result is that the last 15% of battery capacity can not be made available with rapid charging techniques due to the reduction in the charge rate necessary to avoid overheating and gas production. This fails to meet the goal of full capacity recharging, and prolonged undercharging also results in a sharp decrease in battery life and capacity. In addition, currently available rapid charging techniques involve complex and expensive recharger infrastructure.

Thus, there is a clear need in the industry for an alternative battery charging system and method to enhance battery charging and reduce the time necessary for recharging, while at the same time reducing the costs and complexities associated with current charging techniques.

SUMMARY OF THE INVENTION

As will be explained more fully hereinafter, the present invention, by utilizing sound to enhance the charging of batteries, overcomes the inadequacies and deficiencies of the prior art as noted above and as generally known in the industry. This is accomplished by subjecting a battery to acoustic excitation while the battery is being charged by known means (e.g., constant current, constant voltage, pulsed current, and all combinations thereof). This use of acoustic excitation results in increased battery life, reduces battery charging time and reduces the energy needed to charge the battery. The present invention is much easier and less costly to use than other charging systems and methods currently used to enhance conventional charging techniques. The present invention also may be used to rejuvenate dead batteries.

The numerous objects, features, and advantages of the present invention will become apparent to one with skill in the art upon examination of the drawings and the following detailed description. Any and all additional objects, features and advantages which may become apparent are intended to be included herein within this disclosure.

DETAILED DESCRIPTION OF THE PREFERRED EMBODIMENTS

Figure 1:
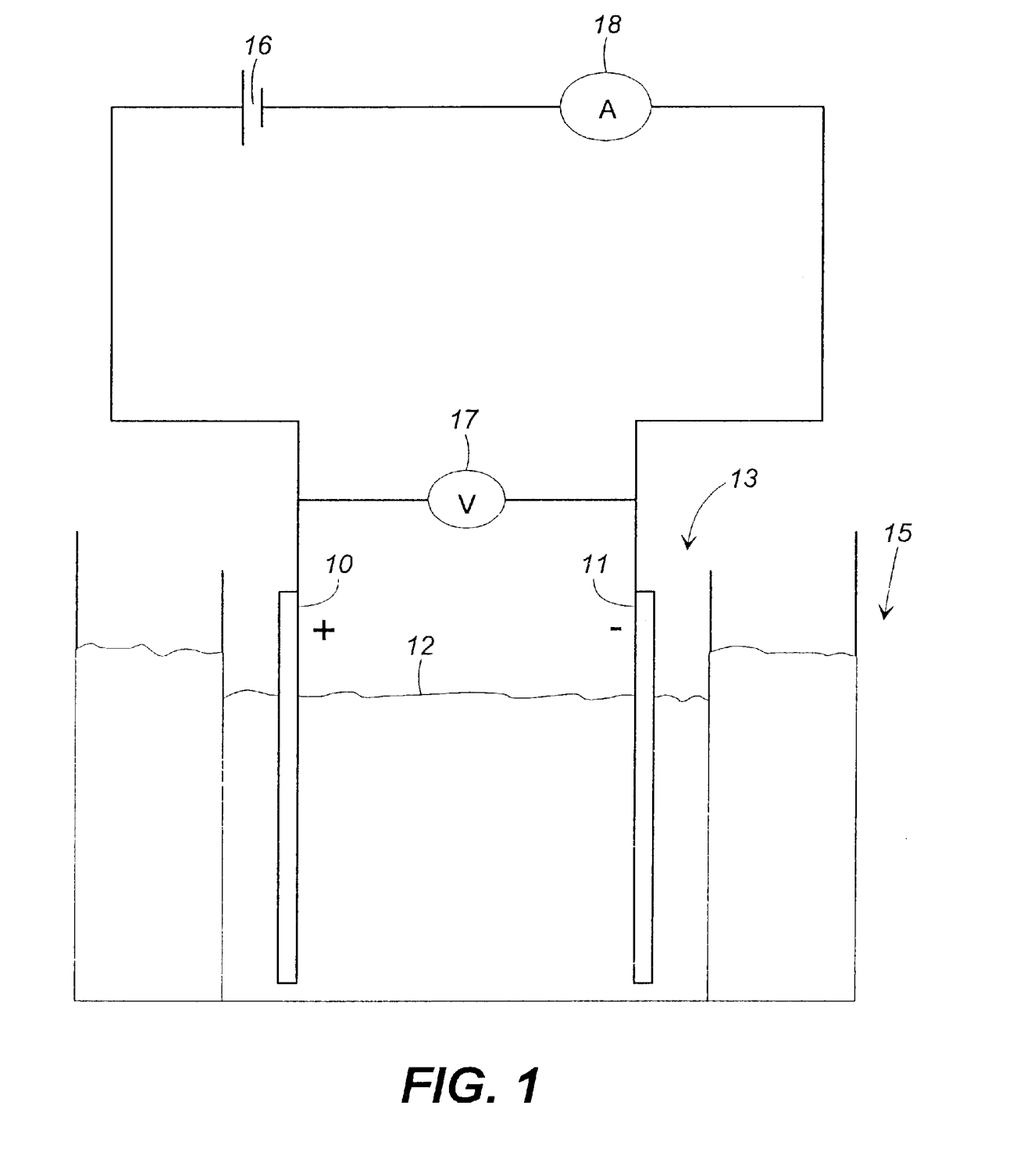
FIG. 1 is a schematic diagram showing a first embodiment of the system and method for charging a battery with acoustic excitation in accordance with the present invention.

With reference now to the drawings wherein like reference numerals designate corresponding parts throughout the several views, FIG. 1 illustrates a first embodiment of the system and method for charging a battery in accordance with the present invention. Two electrodes 10 and 11 composed of lead and lead oxide are disposed in a container 14 containing sulfuric acid electrolyte 12 to form a one cell lead acid battery 13. Although the battery shown for purposes of illustrating the invention is a one cell battery, the invention may be used with any type of rechargeable battery, and the same principles described hereinafter apply equally to multi-cell batteries.

The battery 13 is placed in a commercially available ultrasonic bath 15 of the type commonly used in the jewelry industry to clean jewelry and in the dental industry to clean dental utensils, such as Branson Ultrasonic Cleaners Model 1210-MT and Crest Ultrasonic Cleaners Model 1750. The ultrasonic bath 15 is used to apply acoustic excitation to the battery 13. A power supply 16 is connected across the battery 13, which, in this embodiment is a direct current (DC) power supply. However, the type of power supply is not critical to the invention and any source of power appropriate to charging a battery (i.e., power supplies for constant voltage and constant current charging, pulse charging and other rapid charging techniques, and all combinations thereof) may be used. A voltmeter 17 to measure the charging voltage is connected to the battery 13 in parallel with the power supply 16. An ammeter 18 for measuring the charging current is connected to the battery 13 in series with the power supply 16.

Figure 2:
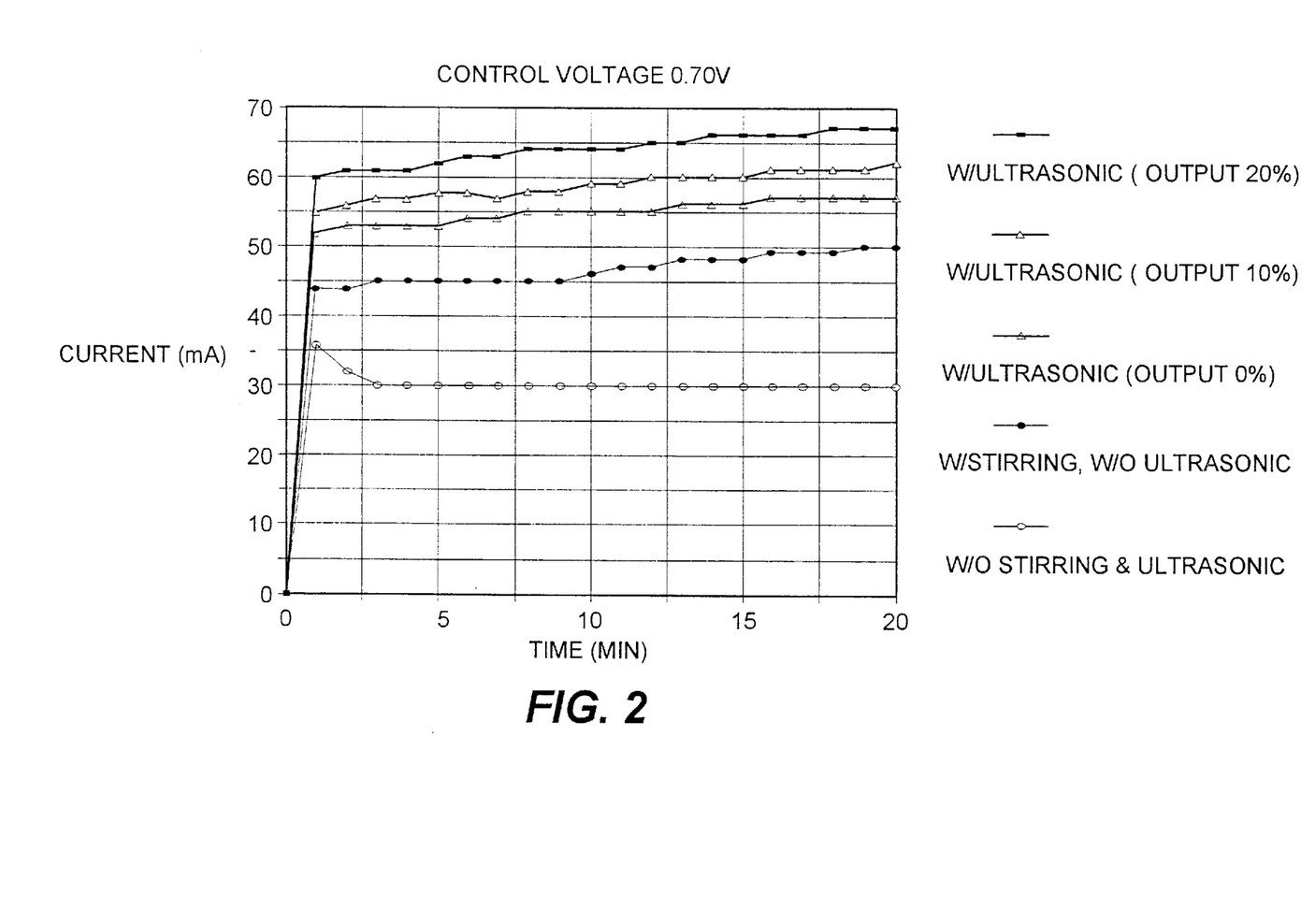
FIG. 2 is a graph illustrating the experimental results obtained by applying a fixed control voltage of 0.70V to the battery depicted in FIG. 1 with no excitation and with various levels of acoustic excitation.

A commonly used method for charging a battery is to provide a constant charging voltage across the battery's electrodes. FIG. 2 is a graph illustrating the experimental results obtained by applying a constant charging voltage of 0.70V to the battery depicted in FIG. 1 for a period of 20 minutes. While the charging voltage is applied, the ultrasonic bath 15 is used to provide varying amounts of acoustic excitation to the battery 13 at a frequency of approximately 20 kHz. The ultrasonic bath 15 used in the experiment was rated at a peak capacity of 80 W of acoustic power. Five excitation states were observed and graphed. As depicted from bottom to top on the graph of FIG. 2, these excitation states were: (1) no excitation; (2) excitation only by stirring of the electrolyte without turning on the ultrasonic bath; (3) acoustic excitation with the ultrasonic bath turned on and the output set to 0% (i.e., residual ultrasonic output only); (4) acoustic excitation with the output of the ultrasonic bath set to 10% (i.e., approximately 8 W of output); and (5) acoustic excitation with the output of the ultrasonic bath set to 20% (i.e., approximately 16 W of output).

The experimental results depicted in FIG. 2 show that an increase in acoustic excitation results in an increase in the available charging current. With no acoustic excitation, the observed charging current was approximately 30 mA. When the electrolyte was excited only by stirring, the observed charging current increased to between approximately 45 mA and 50 mA. Addition of acoustic excitation by turning on the ultrasonic bath with the output set to 0% (i.e., residual ultrasonic output only) increased the observed charging current to between approximately 52 mA and 57 mA. Increasing acoustic excitation by increasing the output of the ultrasonic bath to 10% (i.e., approximately 8 W of output) resulted in a corresponding increase in the charging current to between approximately 55 mA and 62 mA. When the output of the ultrasonic bath was increased to 20% (i.e., approximately 16 W of output), the charging current increased to between approximately 60 mA and 67 mA.

As illustrated in FIG. 2, for a fixed charging voltage the current available for charging increases as increased acoustic excitation is provided. Because the addition of acoustic excitation increases the available charging current, the battery may be charged in a shorter period of time for a given charging voltage.

Figure 3:
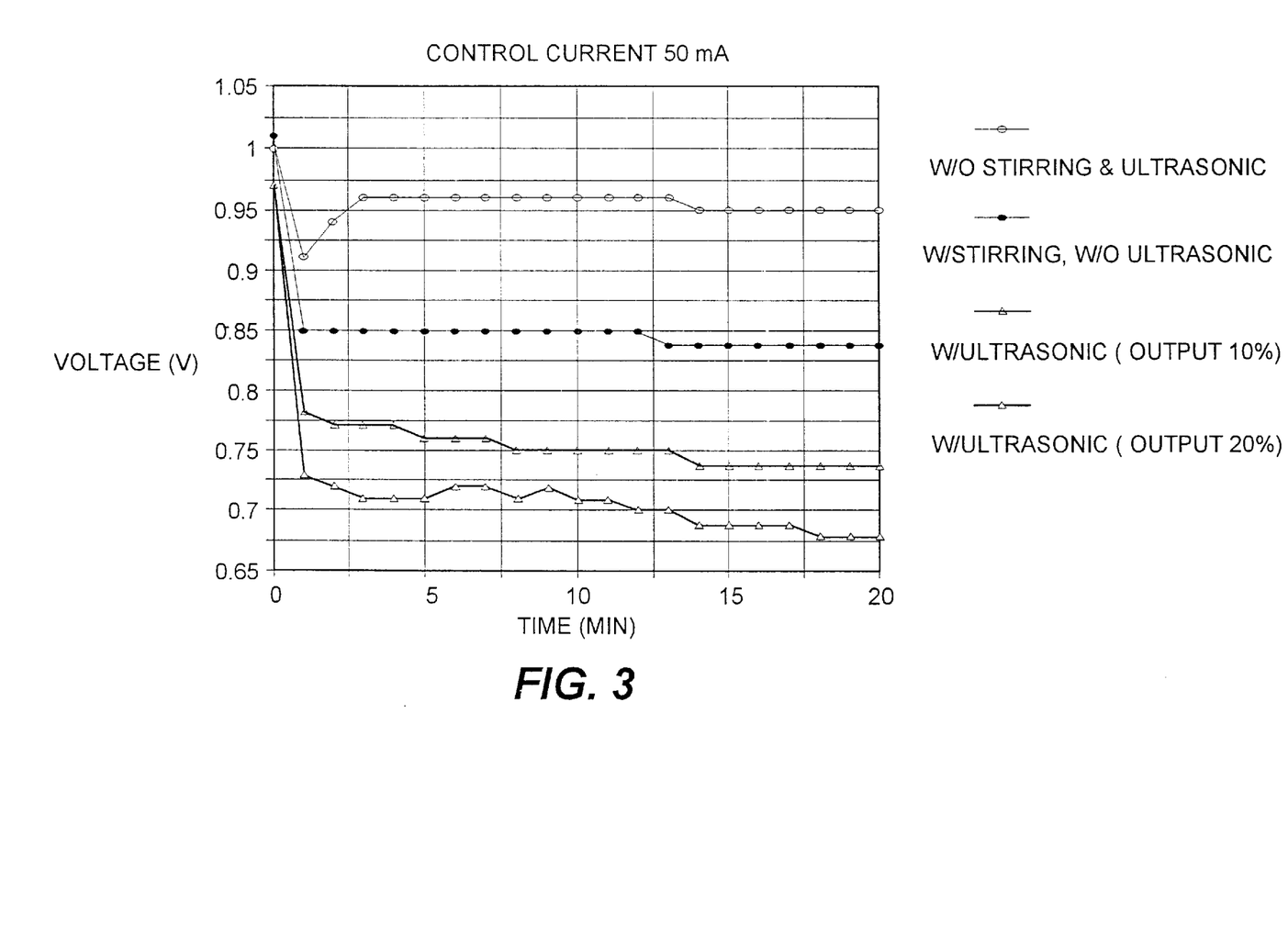
FIG. 3 is a graph illustrating the experimental results obtained by applying a fixed control current of 50 mA to the battery depicted in FIG. 1 with no excitation and with various levels of acoustic excitation.

Another commonly used method for charging a battery is to provide the battery with a constant charging current. FIG. 3 is a graph illustrating the experimental results obtained by applying a constant charging current of 50 mA to the battery depicted in FIG. 1 for a period of 20 minutes. While the charging current is applied, the ultrasonic bath 15 is used to provide varying amounts of acoustic excitation to the battery 13 at a frequency of approximately 20 kHz. In this experiment, four excitation states were observed and graphed. As depicted from top to bottom on the graph of FIG. 3, these excitation states were: (1) no excitation; (2) excitation only by stirring of the electrolyte without turning on the ultrasonic bath; (3) acoustic excitation with the output of the ultrasonic bath set to 10%; and (4) acoustic excitation with the output of the ultrasonic bath set to 20%.

The experimental results depicted in FIG. 3 show that for a constant charging current of 50 mA, an increase in acoustic excitation results in an decrease in the required charging voltage. With no acoustic excitation, the observed charging voltage was between approximately 0.92V and 0.96V. When the electrolyte was excited only by stirring, the observed charging voltage decreased to between approximately 0.85V and 0.84V. Addition of acoustic excitation by setting the ultrasonic bath to 10% output decreased the observed charging voltage to between approximately 0.775V and 0.74V. When the output of the ultrasonic bath was increased to 20%, the charging voltage decreased to between approximately 0.725V and 0.675V.

As illustrated in FIG. 3, for a fixed charging current, the voltage required for charging decreases as increased acoustic excitation is provided.

Figure 4:
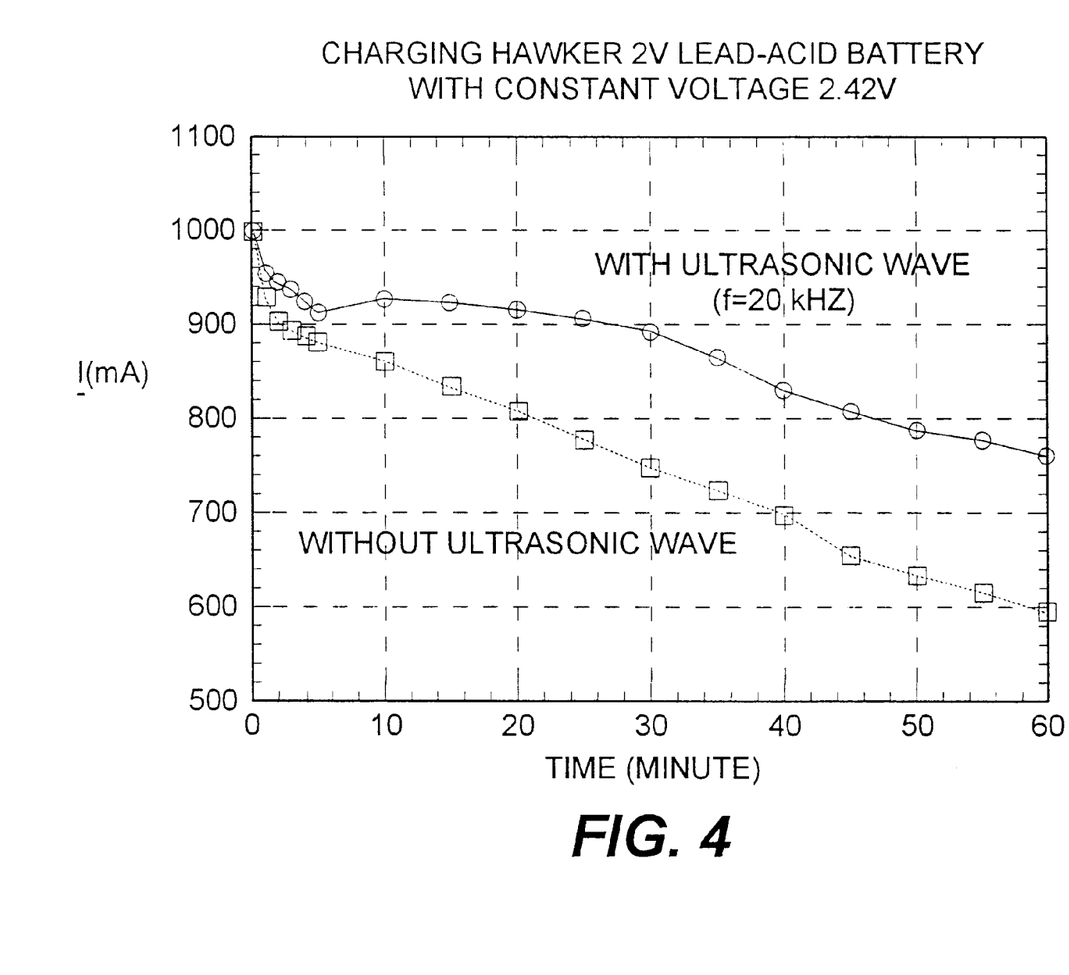
FIG. 4 is a graph illustrating the effect of acoustic excitation on the charging of a standard 2V lead-acid battery at a fixed charging voltage of 2.42V.

The increased efficiency of charging batteries with acoustic excitation was validated by utilizing the configuration of FIG. 1 to charge a standard commercially available battery. A typical Hawker Cyclon 2V (2.5 Ah) sealed lead-acid battery cell was used in lieu of the one cell battery 13. The Hawker battery was placed in the ultrasonic bath 15 and provided with a constant charging voltage of 2.42V for 60 minutes. FIG. 4 is a graph of the results, which illustrates the advantage of acoustic excitation. Without acoustic excitation, the charging current decreased from a starting current of 1000 mA to 600 mA over the 60 minute charging period. When acoustic (ultrasonic) excitation was added at a frequency of 20 kHz and an ultrasonic wave power density of approximately 50 mW/cm$^2$, the 1000 mA starting current decreased to only 760 mA over the 60 minute charging period.

Figure 5:
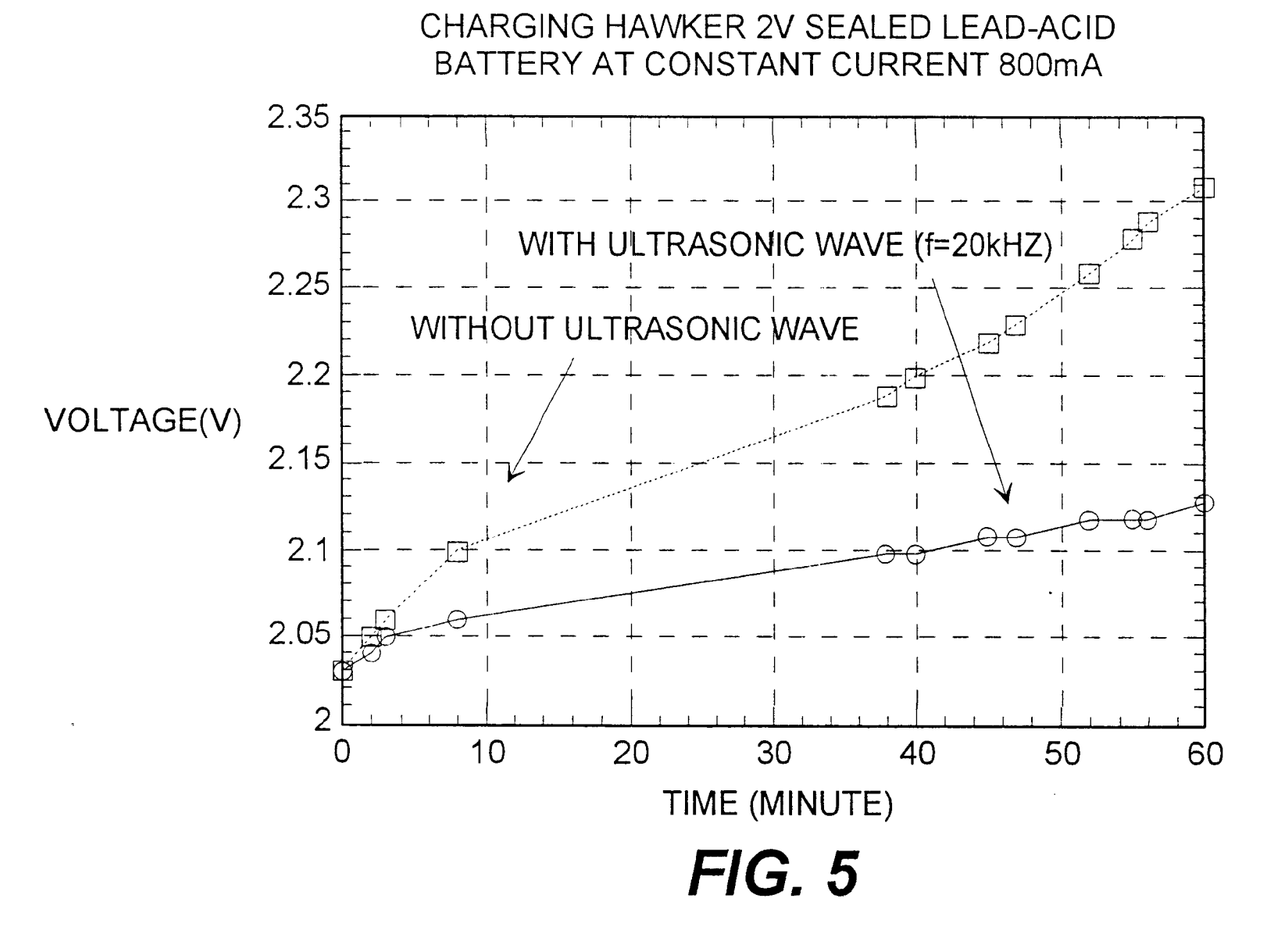
FIG. 5 is a graph illustrating the effect of acoustic excitation on the charging of a standard 2V lead-acid battery at a fixed charging current of 800 mA.

FIG. 5 illustrates the advantage of acoustic excitation when using constant current to charge a standard commercially available battery. Again, the charging configuration of FIG. 1 was utilized, with a typical Hawker Cyclon 2V (2.5 Ah) sealed lead-acid battery used in lieu of the one cell battery 13. The Hawker battery was placed in the ultrasonic bath at a constant charging current of 800 mA. Without acoustic excitation, the required charging voltage increased from a starting voltage of 2.03V to a maximum of 2.31V over a 60 minute charging period. When the experiment was repeated with the addition of acoustic (ultrasonic) excitation at a frequency of 20 kHz and an ultrasonic wave power density of approximately 50 mW/cm$^2$, the required charging voltage increased from a starting voltage of 2.03V to a maximum of only 2.13V over a 60 minute charging period.

Figure 6:
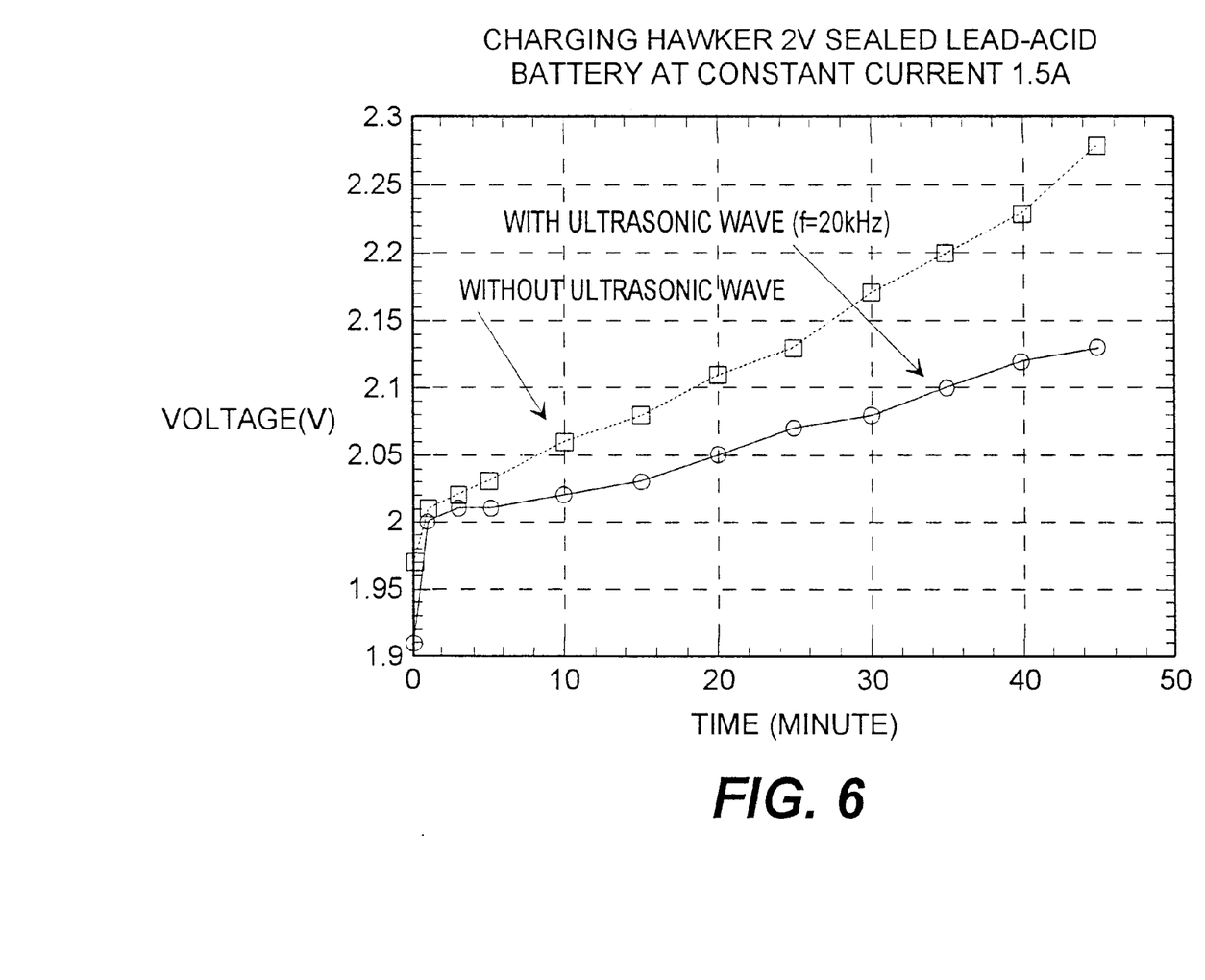
FIG. 6 is a graph illustrating the effect of acoustic excitation on the charging of a standard 2V lead-acid battery at a fixed charging current of 1.5 A.

The experiment graphed in FIG. 5 was repeated with a constant charging current of 1.5 A. The results of this experiment are graphed in FIG. 6. Without acoustic excitation, the required charging voltage increased from a starting voltage of 1.97V to a maximum of 2.28V over a 45 minute charging period. When the experiment was repeated with the addition of acoustic (ultrasonic) excitation at a frequency of 20 kHz and an ultrasonic wave power density of approximately 50 mW/cm$^2$, the required charging voltage increased from a starting voltage of 1.91V to a maximum of only 2.13V over a 45 minute charging period.

Cycle life tests were also performed using a 6V (2 Ah) flooded motocross lead-acid battery. These tests indicate that the cycle life for batteries exposed to acoustic excitation can be increased up to 2–3 times longer than the cycle life for batteries not exposed to acoustic excitation.

Tests were also performed with 3.6V, 300 mAh NiCd batteries that had been used in the field and returned for recharging. The observed results of these tests were that the capacity of these batteries after recharging was increased from approximately 68% without acoustic excitation to 93% when acoustic excitation was applied.

Figure 7:
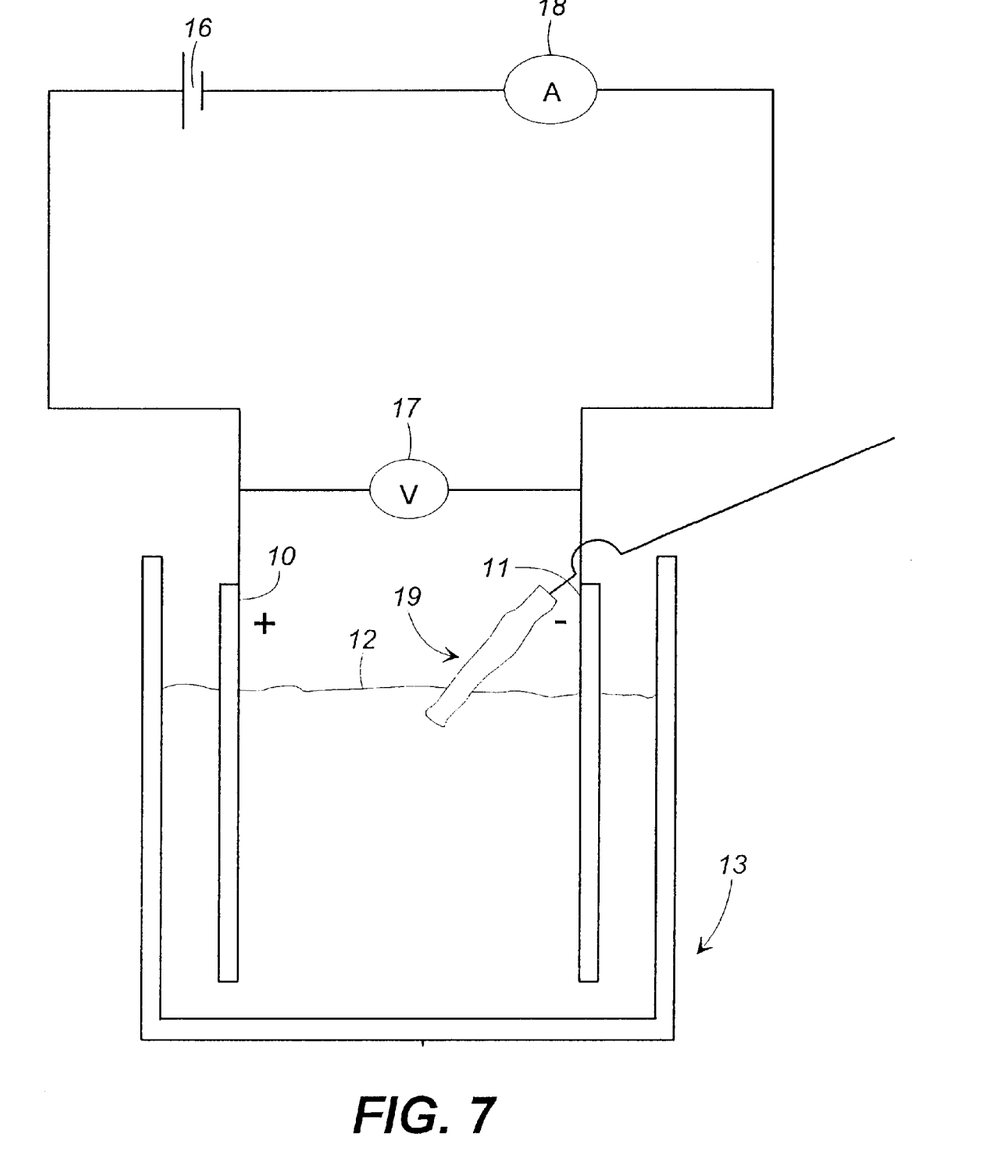
FIG. 7 is a schematic diagram showing a second embodiment of a system and method for charging a battery with acoustic excitation in accordance with the present invention.

FIG. 7 illustrates a second embodiment of the present invention. This embodiment contains the same components as the embodiment of FIG. 1, with the exception that there is no ultrasonic bath. Instead, in this embodiment, the acoustic excitation is provided by an external sound source 19 that is dipped into the one cell battery 13.

Figure 8:
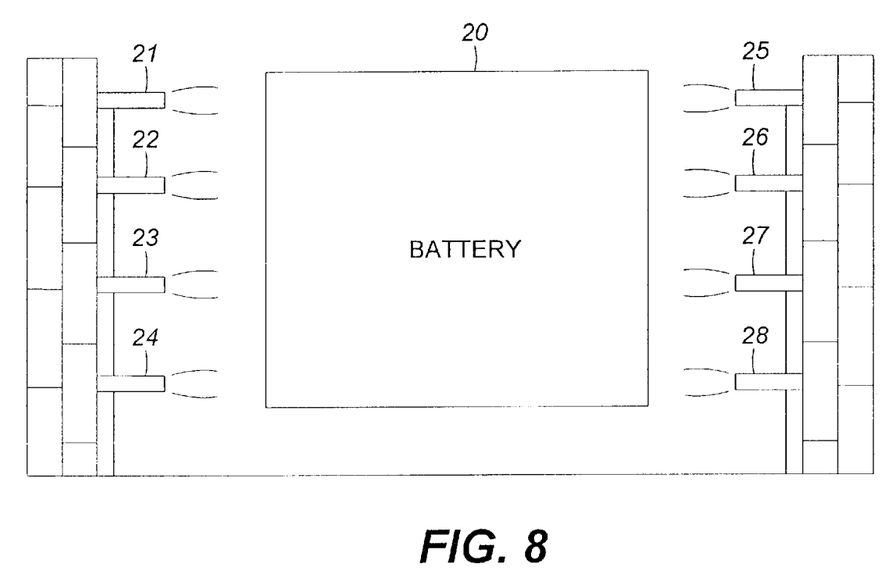
FIG. 8 is a schematic diagram showing a third embodiment of a system and method for subjecting a battery to acoustic excitation in accordance with the present invention.

FIG. 8 illustrates a third embodiment of the present invention, wherein a battery 20 is excited acoustically by sound produced by a plurality of high-speed air jets 21–28 while being charged by a conventional power supply (not shown).

Figure 9:
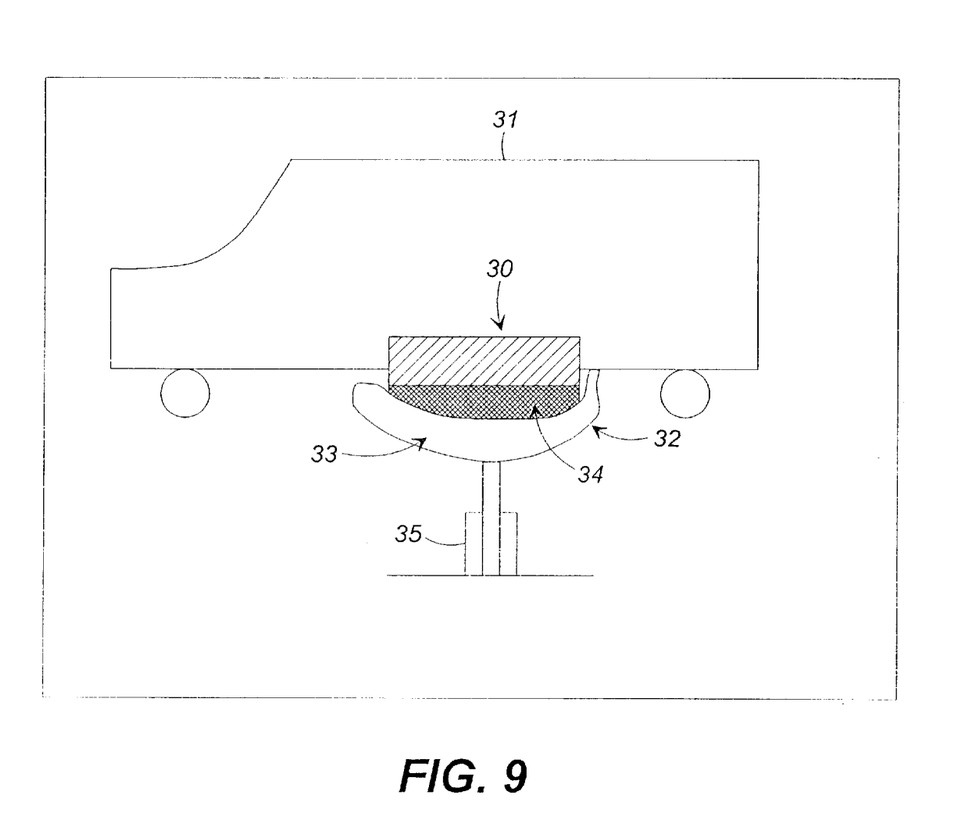
FIG. 9 is a schematic diagram showing a fourth embodiment of a system and method for charging a battery with acoustic excitation in accordance with the present invention.

FIG. 9 illustrates a fourth embodiment of the present invention, wherein the present invention is used to recharge a battery 30 mounted in an electric vehicle 31. A fluid container 32 made out of a flexible material such as rubber is fabricated to enclose an ultrasonic sound source 33. The fluid container is then placed into contact with the battery 30 by a mechanical telescopic arrangement 35 or other conventional means. The contacting surfaces are coupled with a commercially available coupling gel 34 of the type commonly used in medical ultrasound imaging to increase electrical and acoustical conductivity. A conventional power supply (not shown) is used to charge the battery 30.

While specific apparatus arrangements for implementing a battery charging system and method in accordance with the present invention are described, it should be understood that alternative apparatus arrangements are anticipated. Furthermore, it will be obvious to those skilled in the art that many variations and modifications may be made to the preferred embodiments as described above without substantially departing from the spirit and scope of the present invention.

The system and method of the present invention is of general application and can be used to enhance conventional charging processes such as constant voltage and constant current charging, pulse charging and other rapid charging techniques, and all combinations thereof. The present invention may be used with any electrically rechargeable battery (e.g., lead-acid, nickel cadmium (NiCd)), and any sound source, although ultrasonic is preferred due to its charging capabilities and the fact that it is inaudible to the human ear, making it more compatible for use in any environment. It is intended that all such variations and modifications be included within the scope of the present invention, as set forth in the following claims.

Now, therefore, the following is claimed:

1. A system for charging a battery having at least first and second electrodes, comprising:
   a power source for applying electrical energy to the electrodes of the battery; and
   a source of sound waves for subjecting the battery to acoustic excitation substantially simultaneously with the application of said electrical energy, wherein said source of sound waves is selected from the group consisting of:
   an ultrasonic bath adapted to contain the battery during charging; at least one air jet directed to impinge on the battery; and
   a fluid container fabricated from a flexible material and enclosing a sound transducer, said fluid container being acoustically coupled to the battery.

2. The system of claim 1, wherein said fluid container is acoustically coupled to the battery by a coupling gel, said coupling gel being capable of enhancing the electrical and acoustical conductivity between said fluid container and the battery.

3. The system of claim 1, wherein said fluid container is fabricated from rubber.

4. The system of claim 1, wherein said air jet is a high-speed air jet.

5. The system of claim 1, wherein said system is used to rejuvenate a battery.

6. The system of claim 1 wherein said power source applies a charging voltage to the electrodes of the battery.

7. The system of claim 6 wherein said charging voltage is a constant voltage.

8. The system of claim 6 wherein said power supply applies a combination of constant voltage, constant current and pulsed current to the electrodes of the battery.

9. The system of claim 1 wherein said power source applies a charging current to the electrodes of the battery.

10. The system of claim 9 wherein said charging current is a constant current.

11. The system of claim 9 wherein said charging current is a pulsed current.

12. A method for charging a battery having at least first and second electrodes, comprising the steps of:
    applying electrical energy to the electrodes of the battery; and
    subjecting the battery to acoustic excitation substantially simultaneously with the application of electrical energy, wherein said acoustic excitation is supplied from a source selected from the group consisting of:
    an ultrasonic bath adapted to contain the battery during charging; at least one air jet directed to impinge on the battery; and a fluid container fabricated from a flexible material and enclosing a sound transducer, said fluid container being acoustically coupled to the battery.

13. The method of claim 12, wherein said fluid container is acoustically coupled to the battery by a coupling gel, said coupling gel being capable of enhancing the electrical and acoustical conductivity between said fluid container and the battery.

14. The method of claim 12, wherein said fluid container is fabricated from rubber.

15. The method of claim 12, wherein said air jet is a high-speed air jet.

16. The method of claim 12, wherein said method is used to rejuvenate a battery.

17. The method of claim 12 wherein said applying step comprises applying a charging voltage to the electrodes of the battery.

18. The method of claim 17 wherein said charging voltage is a constant voltage.

19. The method of claim 12 wherein said applying step comprise applying a charging current to the electrodes of the battery.

20. The method of claim 19 wherein said charging current is a constant current.

21. The method of claim 19 wherein said charging current is a pulsed current.

22. The method of claim 12 wherein said applying step comprises applying a combination of constant voltage, constant current and pulsed current to the electrodes of the battery.

* * * * *